H. A. HOUSE.
Flexible Shaft.

No. 218,744. Patented Aug. 19, 1879.

Attest:
William Paylow
Courtney A. Cooper

Inventor
Henry A. House
By his attorney
Charles E. Foster

2 Sheets—Sheet 2.

H. A. HOUSE.
Flexible Shaft.

No. 218,744. Patented Aug. 19, 1879.

Attest:
Courtney A. Cooper.
William Paxton.

Inventor:
Henry A. House
By his attorney
Charles E. Foster

UNITED STATES PATENT OFFICE.

HENRY A. HOUSE, OF BRIDGEPORT, CONNECTICUT.

IMPROVEMENT IN FLEXIBLE SHAFTS.

Specification forming part of Letters Patent No. 218,744, dated August 19, 1879; application filed January 22, 1879.

*To all whom it may concern:*

Be it known that I, HENRY A. HOUSE, of Bridgeport, Fairfield county, Connecticut, have invented Improvements in Flexible Shafts, of which the following is the specification.

The object of my invention is to transmit power from one point to another along curved or bent lines, and to permit any desired adjustment of the transmitting appliances without affecting the motion.

Figure 1:
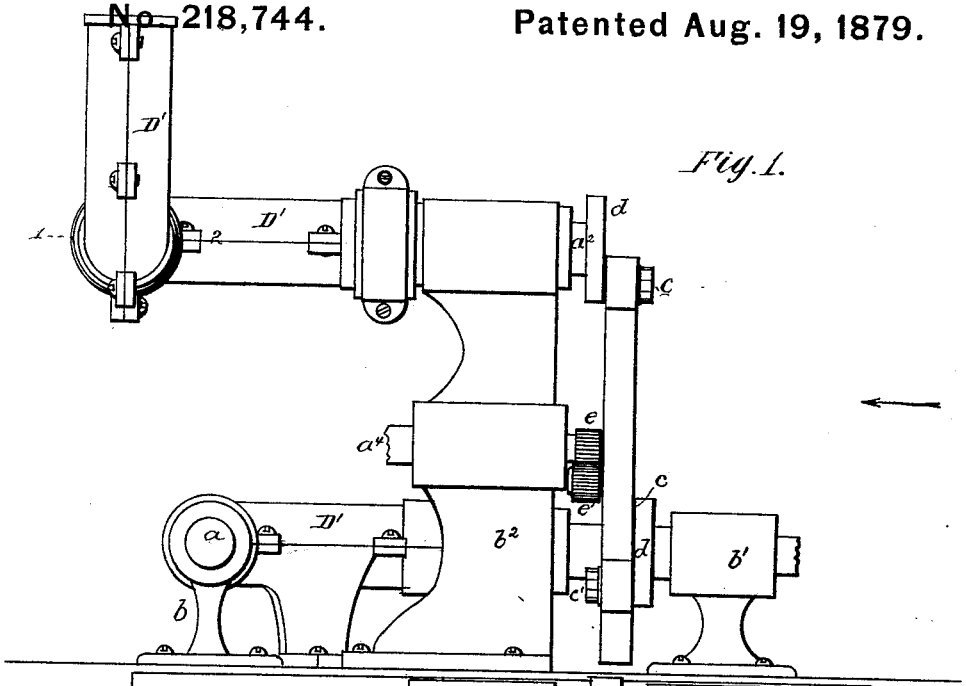
Figure 2:
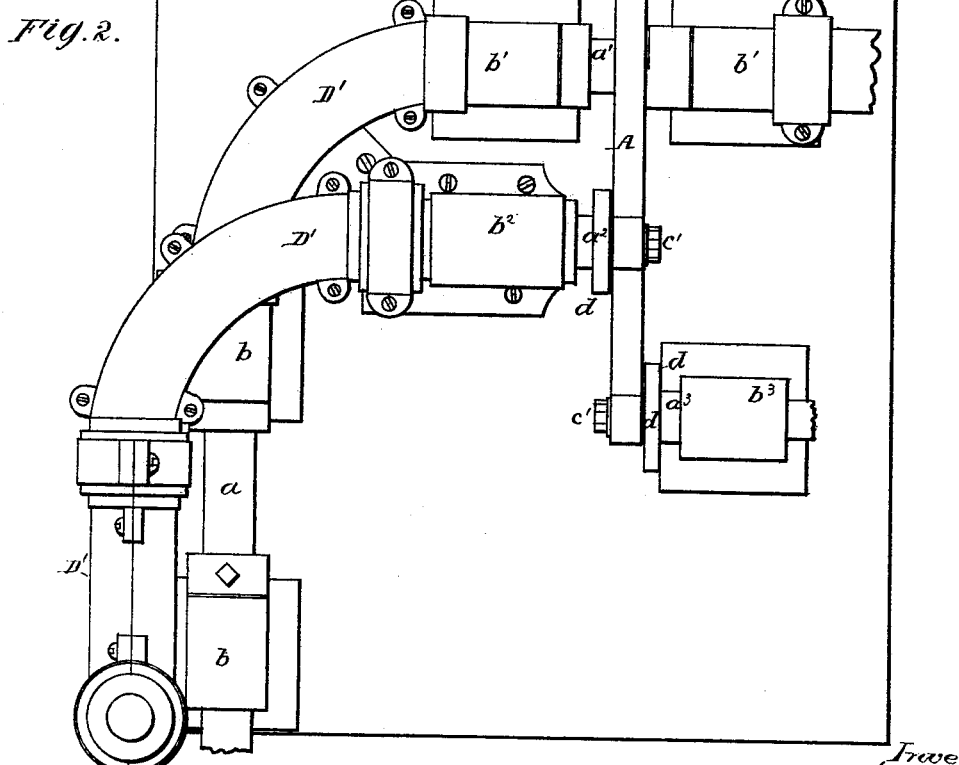
Figure 3:
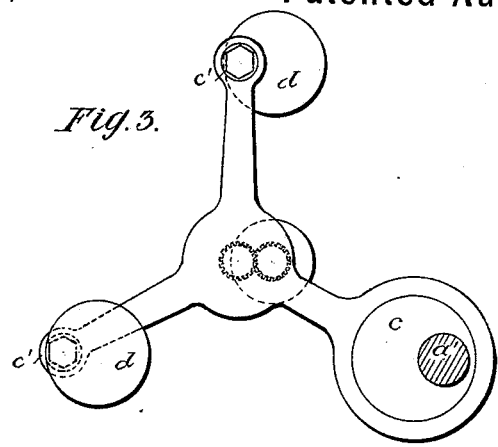
Figure 4:
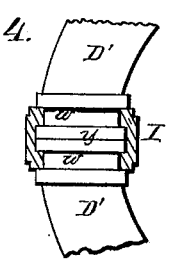
Figure 5:
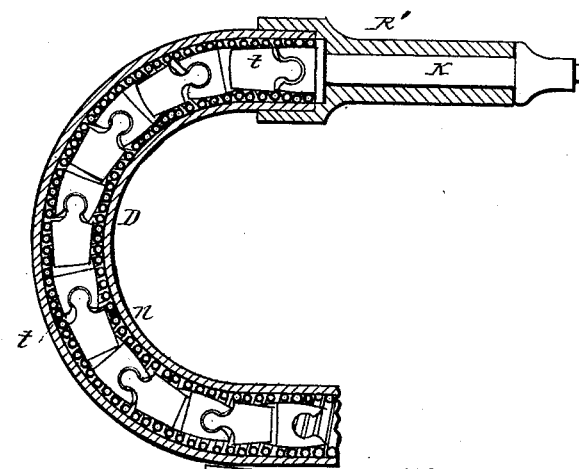
Figure 7:
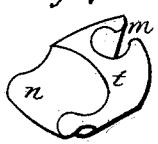
Figure 6:

In the drawings forming part of this specification, Figure 1 is a side elevation, showing shafts and their bearings, with appliances whereby motion may be communicated from one to another and to movable tools; Fig. 2, a plan view of Fig. 1; Fig. 3, a detached view looking in the direction of the arrow, Fig. 1; Fig. 4, a part section on the line 1 2, Fig. 1; Fig. 5, a detached section; Figs. 6 and 7, detached views, showing the transmitting-units; and Figs. 8 to 10, views illustrating modifications.

On reference to Figs. 1, 2, and 3, $a\ a^1\ a^2\ a^3$ represent shafts turning in bearings or standards $b^1\ b^1\ b^2\ b^4$, the shafts $a^1\ a^2\ a^3$ being parallel but at right angles to the shaft $a$, and the shaft $a^2$ being above the shafts $a^1\ a^3$, and equidistant therefrom.

Motion is transmitted from one to the other of the shafts $a^1\ a^2\ a^3$ by means of a frame or spider, A, recessed to receive an eccentric, $c$, on the shaft $a^1$, and to receive crank-pins $c'$ projecting from disks $d$ on the shafts $a^2\ a^3$, so that the spider is carried with the eccentric $c$, and the same motion imparted to all its parts, and thus transmitted from a point on the driving-shaft to the ends of the other shafts.

A fifth shaft, $a^4$, turning in the standard $b^2$, carries a toothed pinion, $e$, to which is adapted a similar fixed pinion, $e'$, carried by the spider A round the pinion $e$ and rotating the latter, thus imparting two revolutions to the shaft $a^4$ to each rotation of the other shafts.

Motion is transferred from the shaft $a^1$ to the shaft $a$ by means of links or units constituting a flexible rotary shaft. Each link is a metal block, having at one end one or more projections, and at the other corresponding recesses.

Figure 8:
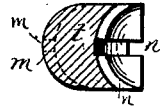
Figure 9:
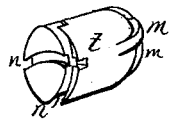
Figure 10:
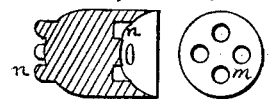

These links may be of different forms. Each, for instance, may have one end recessed, and the other rounded, with ribs $n\ n$ at one end, and transverse grooves $m\ m$ at the other, as shown in Figs. 8 and 9, or with a series of projections, $n$, at one end, and corresponding recesses at the other, as in Fig. 10.

I prefer, however, the form shown in Figs. 6 and 7, with tapering bodies $t$, ribs or projections $n$, and transverse recesses $m$.

That the units may be loosely connected, but incapable of longitudinal separation, each rib $n$ is enlarged at the end, and the corresponding groove $m$ contracted at the mouth. Thus constructed, the rib of one unit may be introduced laterally into the groove of the other, Fig. 6, thus connecting them longitudinally in a chain.

To maintain the units in juxtaposition without interfering with their free movements, they are inclosed in a tube or case, D, which may be rigid, to connect two shafts, $a\ a^1$, turning in fixed bearings, or may be movable or flexible, to communicate motion while permitting the shaft to be bent or curved to any required degree. In all cases the end of the driving-shaft $a$ is suitably coupled with the end link of the chain.

The units are introduced successively into the tube or case, each additional unit being connected to that near the end of the case until the latter is full, when any suitable connections are made with the shafts and tools or devices to or from which a rotary motion is to be communicated.

As one unit is revolved it has at all times a lateral bearing upon some part of and carries the next, and any amount of power less than that capable of breaking the ribs $n$ may thus be transmitted.

The case may consist of a spiral coil of wire, $t$, inclosed in a leather or canvas cover, $u$, Fig. 5, or a series of hollow quadrants, J, carrying the coil of links, may be coupled together so as to be movable one in respect to the other. Thus each quadrant may have, near the end, an annular groove, $w$, and an end rib, $y$; and a divided clamp, I, recessed to receive the lips, is applied thereto so as to maintain the quadrants in end contact, but permit each to be rotated. By thus employing two quadrants together the motion may be imparted at any angle to the driving shaft, the adjustment of the quadrants in no way affecting the operation of the chain of units rotating therein, and by the use of intermediate straight tubes motion can be transmitted to any distance at any angle.

To facilitate the construction each quadrant may consist of two longitudinal half-sections, connected by bolts passing through ears of each.

To give proper stability to the tool-holder K it is fitted to rotate in a nipple, R, which is clamped to the end of the case, whether flexible or jointed, Fig. 5.

It has been found that the units will revolve in the case, whether rigid or flexible, with but little friction, and that after the parts are in operation there is no play or lost motion.

It will be apparent that the units may be cast of proper shape, and that a flexible or angular rotary connection of indefinite extension may thus be made at a slight cost.

I claim—

1. As an improved device for transmitting power, a series of units or links, each with one or more end projections fitting in end recesses of the other, and inclosed in a hollow case, substantially as specified.

2. A flexible shaft, consisting of a flexible or adjustable case containing a series of units, each having at one end one or more ribs or projections adapted to recesses in the opposite ends of the next unit, substantially as set forth.

3. The combination, with the case or holder, of units having projections enlarged at the ends and grooves contracted at the mouths, whereby longitudinal separation is prevented, substantially as set forth.

4. The units constructed to bear laterally while rotating at an angle to each other, as set forth.

5. The combination of the hollow quadrants, coupled together and carrying a series of loosely-connected units, substantially as specified.

6. The combination, with the equidistant shafts $a^1$ $a^2$ $a^3$, of a spider or frame, A, driven by an eccentric on one shaft, and connected to crank-pins on the other shafts, substantially as and for the purpose set forth.

In testimony whereof I have signed my name to this specification in the presence of two subscribing witnesses.

HENRY A. HOUSE.

Witnesses:
  GEORGE C. BISHOP,
  ALFRED B. BEERS.